United States Patent [19]

Rouse

[11] Patent Number: 5,005,276
[45] Date of Patent: Apr. 9, 1991

[54] APPARATUS FOR ACCURATELY ASSEMBLING LARGE SCALE MACHINE PARTS

[75] Inventor: Marshall J. Rouse, Charlotte, N.C.

[73] Assignee: Westinghouse Electric Corp., Pittsburgh, Pa.

[21] Appl. No.: 461,575

[22] Filed: Jan. 5, 1990

[51] Int. Cl.$^5$ .............................................. B23P 19/04
[52] U.S. Cl. ........................................ 29/244; 29/282
[58] Field of Search ................. 29/467, 244, 245-255, 29/282; 269/58, 287

[56] References Cited

U.S. PATENT DOCUMENTS 4,707,900 11/1987 Twogood et al. ..................... 29/244
4,711,011 12/1987 Nugier .............................. 29/244 X Primary Examiner—Timothy V. Eley
Attorney, Agent, or Firm—K. Bach

[57] ABSTRACT

Apparatus for lifting and applying torque to an object is disclosed. The apparatus comprises a releasable spring counterbalance which resiliently connects a drive for engaging applying torque to the object to a means for lifting an object, such as a crane. Preferably, a body portion connects the drive and a means for supporting the object. A spring counterbalance reduces the force due to the weight of the object which bears upon the threads when the object is lifted into a position to be torqued. After the threads are initially engaged, the counterbalance is removed and torque applied to the drive means. Torque is transferred through the body portion to the object. Thus, problems associated with the handling of large parts and initially engaging threaded connections are substantially reduced, since the initial engagement takes place under conditions of reduced force. The apparatus of the present invention creates a "soft" or "floating" connection between the material handling apparatus and the part being assembled. In a preferred embodiment, apparatus for installing a throttle valve bushing in a throttle valve bonnet is disclosed. Methods of assembling machine parts are also disclosed.

14 Claims, 1 Drawing Sheet

APPARATUS FOR ACCURATELY ASSEMBLING LARGE SCALE MACHINE PARTS

BACKGROUND OF THE INVENTION

Field of the Invention

The present invention is directed to methods and apparatus for assembling large scale machine parts. Specifically, methods and apparatus are provided for lifting and torquing steam turbine throttle valve bushings in a controlled manner.

Although large scale machinery such as steam turbines are comprised of smaller sub-assemblies and parts which are assembled using conventional fasteners such as threaded connections, the size and bulk of these parts makes assembly an extremely difficult task. For example, a steam turbine throttle valve bushing which is threaded into a throttle valve bonnet weighs about 120 pounds (54 kg). The bushing has a 5.50-12 UN thread, with three close fitting lands below the thread. To assemble the bushing into the bonnet, it must be carefully lowered, the threads aligned, and tightened to an appropriate torque.

Unfortunately, this type of delicate assembly operation is not easily performed by the cranes and other apparatus which are typically used to manipulate such parts. As the bushing is being lowered, it will contact the threaded portion of the bonnet. At this point it is difficult to control most material handling equipment with sufficient precision to prevent the full weight of the bushing from bearing on the bonnet threads. This is not a desirable situation, for several reasons. First, the parts may contact one another in a manner which leads to damage of the threads. The parts may also be brought together in a manner which leads to cross-threading, particularly if the threaded portions are not clearly visible and the size of the part makes if difficult to "feel" if cross-threading has been initiated. Also, even if the parts are initially assembled in a proper alignment, the friction created by the weight of the parts may lead to binding or other difficulties which make accurate torque measurements difficult.

Therefore, it would be desirable to be able to provide a resilient connection between materials handling equipment and the part being handled. It would be further desirable to provide methods and apparatus whereby parts may be guided to a location in a controlled manner, avoiding the problems created by impact and imprecise handling, while allowing subsequent final assembly to a specified torque in an efficient manner.

SUMMARY OF THE INVENTION

Accordingly, it has now been found that large scale parts may be more readily assembled using apparatus for lifting and applying torque to an object comprising a hoist ring for connecting the apparatus to a lifting apparatus and a housing affixed to the hoist ring. A drive means for attaching a means for applying a torque is releasably connected to the housing by a socket retainer. The housing comprises a counterbalance for resiliently connecting the socket retainer and the housing. The apparatus also comprises a means for supporting the object being assembled. A body portion connects the drive means and the support, the body portion is adapted to engage a portion of the object in order to apply a torque to the object during assembly. The counterbalance reduces the force due to the weight of the object when the object is lifted to the position from which it will be torqued, and the torque applied to the drive means is transferred through the body portion to the object. Thus, the problems associated With the handling of large parts are substantially reduced, now that the initial threading takes place under conditions of reduced force. The apparatus of the present invention creates a "soft" or "floating" connection between the material handling apparatus and the part being assembled. In a preferred embodiment, the resilient means are springs which are placed in compression. The apparatus also preferable comprises a releasable connection between the counterbalance and the body portion. By releasing this connection, the full weight of the part is allowed to bear on the other part. After releasing the resilient connection, the body portion remains, exposing a portion which is adapted to receive a torque wrench or other assembly tool.

In a preferred embodiment, apparatus for installing a throttle valve bushing in a throttle valve bonnet is disclosed. The assembly apparatus comprises a body portion having a first end and a second end, the first end forming a socket for manipulating a fastener; the second end is adapted to receive a means for applying torque to the apparatus. A rod portion having threads on at least a portion thereof is releasably attached to the first end of the body portion and a support means for supporting the throttle valve bushing is affixed to the distal end of the rod.

The spring counterbalance for reducing the force between the throttle valve bushing and the throttle valve bonnet, preferably comprises a housing portion having a first end and a second end, the first end has a hoist ring means for cooperating with a lifting device, and the second end is releasably connected to the second end of the body portion. A resilient means is disposed between the first and second end of the housing which permits elastic displacement of the first end relative to the second end. Thus, the normal force due to the weight of the bushing is reduced by the force created by the displacement of the resilient means.

Methods of assembling machine parts are also disclosed. A first and a second part having threaded connections, the first part to be assembled to the second and having a means for applying a torque, are provided. Initially, an assembly apparatus having a first end adapted to cooperate with the means for applying a torque to the first part; a second end adapted to be connected to material handling apparatus is affixed to the first part. The assembly apparatus provides a releasable resilient connection between the material handling apparatus and the first part. The assembly apparatus is then connected to material handling apparatus and the first part is moved into a position to be assembled to the second part. The first part is then lowered into assembly position and the threaded portions of the parts are initially engaged. The first part is, however, resiliently supported by the assembly apparatus such that its full weight does not bear upon the second part. The releasable resilient connection between the material handling apparatus and the first part is then removed. Torque may then be applied to the second end of the assembly apparatus and the assembly apparatus removed from the first part, completing the assembly process.

BRIEF DESCRIPTION OF THE DRAWING

The invention may be better understood, and further advantages and uses thereof are readily apparent, when considered in view of the following detailed description of exemplary embodiments, taken with the accompanying drawing in which.

DESCRIPTION OF THE PREFERRED EMBODIMENTS

Figure 1:
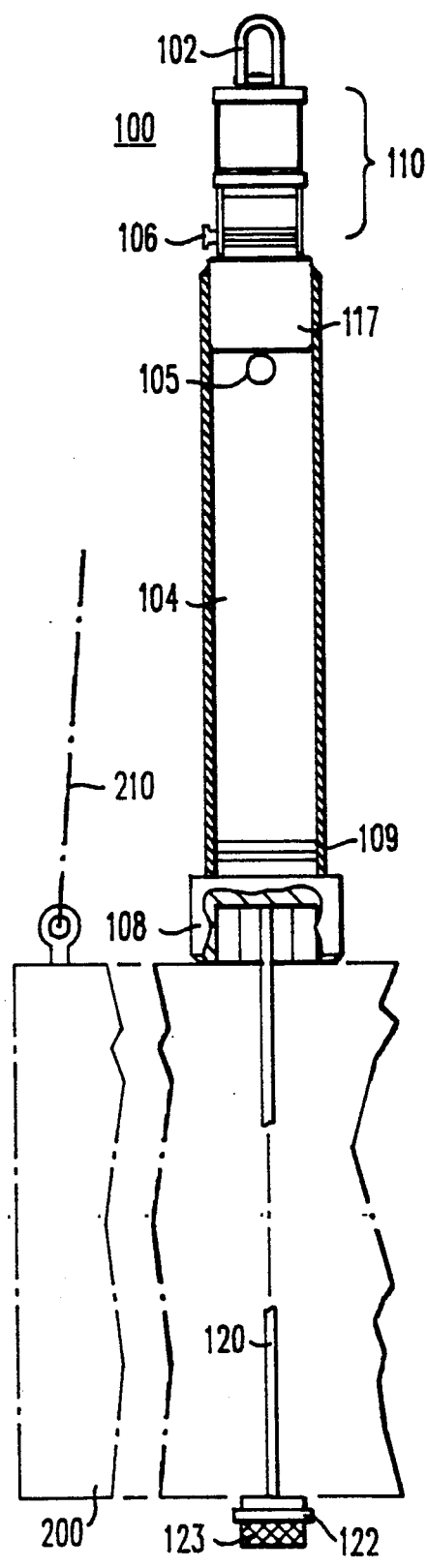
FIG. 1 is an overall side view of a preferred embodiment of a lifting and torquing apparatus of the present invention.

The lifting and torquing device disclosed by the present invention permits a large and unwieldy part to be lifted by a crane or hoist and accurately guided into the location into which it is to be assembled or installed. Referring now to FIG. 1, an overall side view of the present invention is shown. At a first end of the body portion 104 of the apparatus of the present invention 100 a safety hoist ring 102 is provided. The hoist ring 102 permits lifting and manipulating the apparatus of the present invention 100 and the part 200 which is attached to it by a crane, or other means for lifting which provides a force, as shown by the arrow in FIG. 1. The hoist ring 102 may be used alone or in combination with further lifting points 210 disposed on the object or part 200 being assembled. As shown, in the case of an unwieldy or otherwise large part 200, it will be desirable to include one or more further points of attachment 210. The further points of attachment 210 may be connected to the same lifting apparatus as the safety hoist ring 102, or to other lifting apparatus. Alternatively, cables or other guiding means may be connected to the further points of attachment 210 and used to guide, adjust or otherwise manipulate the object while it is being lifted.

The hoist ring 102 is affixed to the spring counterbalance assembly 110, explained in detail below. The spring counterbalance assembly 110 provides a resilient or "soft" connection between the crane or hoist and the part 200. Thus, in the broadest sense, the present invention permits a resilient connection between a means for lifting an object, such as a crane, and the object 200 being lifted. Among the advantages of the apparatus disclosed is that the present invention permits the installation of a part 200 and its subsequent torquing into final assembly in a convenient and efficient manner.

As shown in FIG. 1, the spring counterbalance 110 is releasably connected to the body portion 104 of the apparatus by a releasable connecting means 116. Preferably, the releasable connecting means is provided by a single acting ball lock pin 106 which is inserted in a bore which passes through both the spring counterbalance 110 and the body portion 104. A through hole 105 is also preferably provided. This permits a bar to be inserted through the body 104, allowing the assembly to be manipulated. Upon removal of the lock pin 106, the spring counterbalance 110 can be removed from the rest of the body portion 104 and the remaining apparatus is manipulated using a bar inserted in the through hole 105. Also, upon removal of the spring counterbalance 110 a means for applying torque 117 to the body portion 104 is exposed, thereby enabling the part to be torqued into final assembly.

At the end of the body portion 104 opposite the spring counterbalance 110 a socket means 108 for engaging a connection on the object being assembled is provided. For example, in the case of the steam throttle valve bushing described above, a 4.75 inch (120 mm) hexagonal connection is provided to torque the bushing into the throttle valve bonnet. Thus, in a preferred embodiment, a 4.75 inch (120 mm) socket 108 is affixed to or formed from the distal end of the body portion 104.

In order to lift an object 200, a connection between the object 200 and the socket means 108, must be provided. Such a connection results in the apparatus of the present invention 100 and the object 200 being assembled and acting as a single piece. The object 200 and apparatus 100 are thus capable of being manipulated together until assembly is complete and the apparatus of the present invention 100 removed from the object 200. In a preferred embodiment, a threaded rod 120 connected to the body portion 104 and socket 108 is provided. The proximal end of the threaded rod 120 is preferably rigidly but releasably connected to the body portion 104. This is preferably provided by a hole or other means of engagement in the socket 108 and a set screw 109 which is perpendicular to the threaded rod 120 and prevents it from being withdrawn from the socket 108. At the distal end of the threaded rod 120 a guide or support means 122 is provided. As shown, the support means is preferably threaded directly onto the threaded rod 120. A knurled section 123 is preferably provided to permit the support means to be tightened against the object 200. Thus, as shown in FIG. 1 the threaded rod 120 extends through the object 200 and is terminated at its distal end by the support means 122. The support means 122 is threaded and tightened against the object 200 to firmly hold the apparatus of the present invention 100 against the object 200. It will be understood that the design of the support means 122 will be determined by the geometry of the object 200. As depicted in FIG. 1, if the portion of the object through which the threaded rod 120 extends is a bore of relatively small diameter, the support means 122 may be comprised of a slightly larger member having a surface which urges against the object 200. To manipulate other objects, it may be desirable to provide a support 122 of greater surface area. In all events, the support means 122 should be designed so that it may be removed from the body portion 104, allowing the apparatus of the present invention 100 to be removed from the object or part 200 being assembled.

Figure 2:
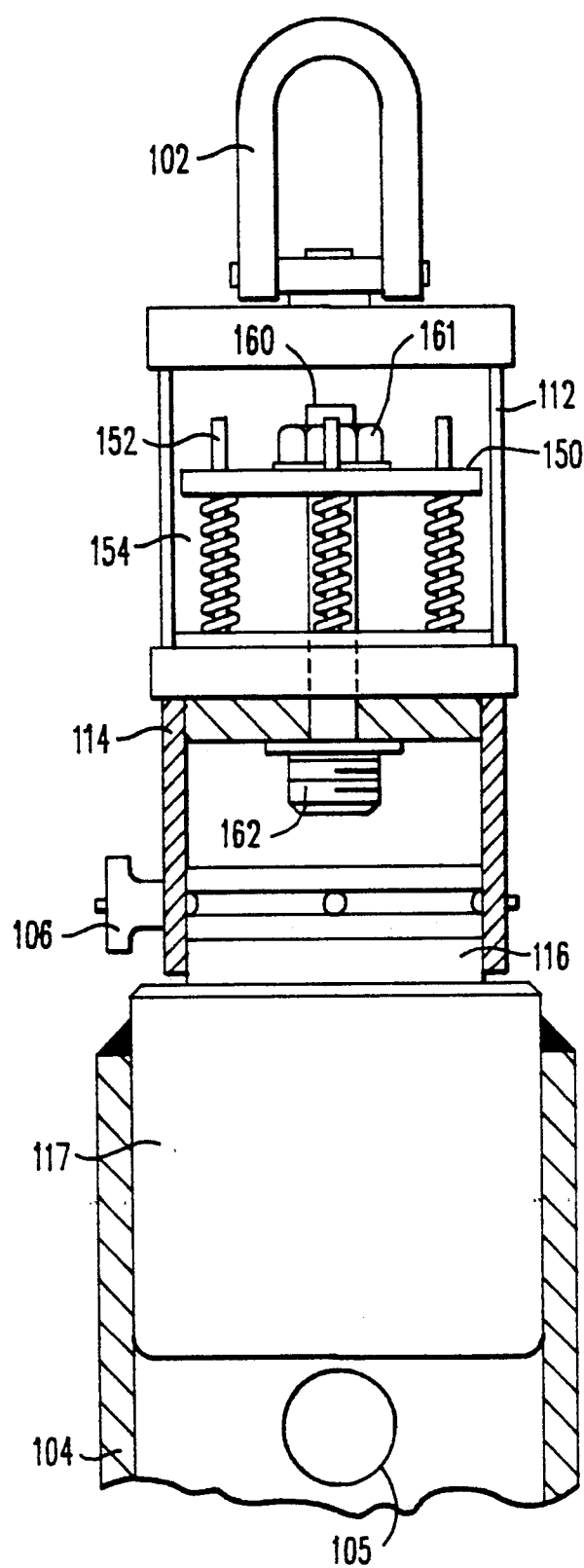
FIG. 2 is a partial side sectional view of the apparatus of FIG. 1 illustrating the details of a preferred spring counterbalance.

The details of a preferred embodiment of the spring counterbalance 110 of the present invention are shown in FIG. 2. The hoist ring 102 is affixed to a first end of the counterbalance housing 112. The opposite end of the counterbalance housing 112 is attached to socket retainer means 114. The socket retainer means, 114, provides the connection between the counterbalance housing and the body portion 104 of the apparatus. As explained above, the socket retainer means 114 is preferably connected to the body portion 104 in a releasable fashion. A pin 106 is preferably provided for this purpose. The pin 106 passes through both the socket retainer means and a drive means 116, for applying torque to the body portion 104. In a preferred embodiment, the drive means 116 comprises a one inch (25 mm) square drive. Preferably, the drive means 116 is the drive end of a 2.25 inch (57 mm) socket 117. The outside diameter of the socket 117 is about 3.25 inches (82 mm) and can thus be fitted into a section of tubing having approximately a 3.25 inch (82 mm) inner diameter and welded in place. A socket 108 can be similarly welded in place at the opposite end. Thus, in a preferred embodiment, a shown in FIG. 1, the body portion 104 is thus comprised of a tubular section having a square drive socket 117 welded to a first end such that the drive portion 116 is exposed and another socket 108 welded to a second end such that the socket portion is exposed.

Referring again to FIG. 2, inside the counterbalance housing 112, the resilient means which provides the "floating" effect of the lifting aspect of the present invention is shown. Preferably a compression plate 150 is provided which is slide fitted to the interior portion of the counterbalance housing 112. The compression plate 150 is shaped to slide fit over and to avoid interference with the connecting bolt 160. As shown, the head 162 of the connecting bolt 160 is lodged against the inner surface of the socket retainer means 114. The threaded portion of the connecting bolt 160 extends upwardly into the counterbalance housing 112. The distal end of the connecting bolt 160 is fitted with a nut 161 or other threaded connector having a somewhat larger diameter than the outside diameter of the bolt 160. As shown, a washer may also be placed between the nut 161 and the compression plate 150. The diameter of the opening in the compression plate 150 must therefore be slightly larger than the outside diameter of the bolt 160 but somewhat smaller than the diameter of the nut 161 in order to permit the plate 150 to urge against the nut 161 without slipping off.

Affixed to the counterbalance housinq 112 are one or more guide posts 152 which extend through openings in the compression plate 150. The openings are sized to provide a sliding fit between the compression plate 150 and the posts 152. Disposed between the compression plate 150 and the bottom of the counterbalance housing 112 and surrounding the guide posts 152 are compression springs 154. In FIG. 2, one compression spring 154 is illustrated, while two others are shown schematically. The number and position of the springs !54 depends upon a variety of factors, such as the load being carried and the spring constant of available springs. Moreover, although a compression spring assembly as shown is a preferred embodiment of the present invention, it may be desirable to provide other resilient means, such as tension springs, elastomeric members or hydraulic cylinders. In most applications, the apparatus will be designed such that the load placed upon the apparatus displaces the socket retainer means 114 from the spring counter balance 110 by a small amount. This displacement permits the apparatus and the attached part to resiliently travel in either direction as it is handled and brought into place.

In use, the apparatus of the present invention is first attached to the part to be assembled. This is preferably accomplished by placing the socket 108 over the portion of the part adapted to receive it and threading the support 122 onto the threaded rod 120. In other embodiments, other means for attachment may be necessary if, for example, an appropriate bore through which the threaded rod 120 may be passed does not exist. In this situation, the design of the apparatus would be modified by adding appropriate straps, braces, extensions or other releasable means of attachment to the part. After the apparatus has been installed on the part, assembly using conventional materials handling equipment may begin.

The provision of a safety hoist ring 102 on the apparatus permits at least one point of attachment to a crane or other liftinq device. It may be desirable in some circumstances to provide other points of attachment to the object being manipulated in order to permit stable handling. The part is then moved to the approximate location of assembly. Substantially all of the weight of the part is preferably borne by the safety hoist ring 102, and thus by the apparatus of the present invention. As explained above, at this point, the socket retainer means 114 will be displaced from the spring counter balance 110. The lowering of the part to be assembled may now begin.

As the part is lowered by the action of the crane, the threads and/or other portions of the part and the location to which it is being assembled will come into contact. However, unlike conventional apparatus, the contact force will not be due to the full weight of the part. Instead, the apparatus of the present invention provides a counterbalancing force, by action of the spring counterbalance 110 described above, which creates a "soft" assembly. As the part is lowered and initial contact is made, the part may be more precisely manipulated during initial engagement of the threads by the resiliency provided by the apparatus of the present invention. As shown, a bore 105 is provided through the body portion 104 which permits a bar to be inserted through the apparatus. The bar may be used to ease the threads into place and initially turn the parts together, with the likelihood of cross threading almost eliminated.

After the part has been initially threaded into place, the material handling apparatus is either disconnected or the tension slackened such that no upward force is exerted upon the apparatus. The pin 106 may then be pulled and the spring counterbalance 110 removed. The drive means 116 is thereby exposed. At this point, since the part is properly threaded in place, an appropriate torque wrench may be applied to the drive means. The part can now be assembled to its final torque.

After the part is fully in place, the apparatus of the present invention may be removed either by unthreading the support 122 and withdrawing the apparatus with the threaded rod 120 attached, or by removing the threaded rod 120 by releasing the set screw 109 which retains it in place. The latter operation may be conducted from the same side as the torquing operation and may be preferable in certain situations where access is limited. In the case of alternate methods of attaching the apparatus to the part, alternate removal methods must also be provided, as will be understood by those of ordinary skill.

Although certain embodiments of the present invention have been described with particularity, numerous variations and modifications will readily present themselves to those of ordinary skill. Accordingly, reference should be made to the appended claims in order to determine the scope of the present invention.

I claim as my invention:

1. Apparatus for lifting an object with a hoist and applying torque to an object using a socket, comprising:
   hoist ring means for connecting the apparatus to the hoist means for lifting;
   housing means affixed to said hoist ring means;
   drive means for attaching a means for applying the socket torque;
   socket retainer means for releasably connecting said housing means and said drive means;
   counterbalance means for resiliently connecting said socket retainer means and said housing means;
   support means for supporting the object; and a body portion connecting said drive means and said support means, said body portion adapted to engage a portion of the object whereby, said counterbalance means reduces the force due to the weight of the object when the object is lifted to the position from which it will be torqued, and whereby the torque applied to said drive means is transferred through said body portion to the object.

2. The apparatus of claim 1, wherein said body portion further comprises means for releasing said support means.

3. The apparatus of claim 1, wherein said housing means houses said counterbalance means.

4. The apparatus of claim 3, wherein said counterbalance means further comprises compression plate means slidably engaged with said connector means, said connector means further comprising means for urging against said compression plate means at one end; and resilient means disposed between said compression plate means and said counterbalance means housing, whereby said resilient means are displaced to create a force when the object is attached to said support means.

5. The apparatus of claim 4 wherein said resilient means are springs.

6. The apparatus of claim 1, further comprising means for accepting a means for applying torque directly to said body portion.

7. The apparatus of claim 4, wherein said connector means comprises a nut and a bolt, the head of said bolt engaging said socket retainer means and said compression plate means urging against the face of said nut.

8. The apparatus of claim 1 wherein said means for releasably connecting said socket retainer means and the drive means is a pin.

9. The apparatus of claim 8, wherein said pin is a ball lock pin.

10. Apparatus for installing a throttle valve bushing in a throttle valve bonnet comprising:

a body portion having a first end and a second end; said first end forming a socket means for manipulating a fastener; said second end adapted to receive means for applying torque to said throttle valve bushing through said apparatus;

a rod portion having a distal end, a proximal end and threads on at least a portion thereof, said proximal end releasably attached to said first end of said body portion;

support means for supporting said throttle valve bushing affixed to said distal end of said rod portion; and spring counterbalance means for reducing the force between said throttle valve bushing and said throttle valve bonnet, comprising a housing portion having a first end and a second end, said first end comprising hoist ring means for cooperating with a lifting device, and said second end of said housing portion releasably connected to said second end of said body portion; and resilient means disposed between said first and second ends of said housing portion which permits elastic displacement of said first end relative to said second end, whereby the normal force due to the weight of said bushing is reduced by the force created by said elastic displacement of the resilient means.

11. The apparatus of claim 1, wherein said resilient means are coil springs and said counterbalance means further comprises a compression plate means disposed within said housing portion, whereby said springs are compressed between said compression plate and said housing portion when a load is applied to said apparatus.

12. The apparatus of claim 10, further comprising means for accepting a means for applying torque directly to said body portion.

13. The apparatus of claim 1 wherein said means for releasably connecting said socket retainer means and said drive means is a pin.

14. In apparatus for lifting and applying torque to an object comprising a hoist ring means for connecting said apparatus to a means for lifting; housing means affixed to said hoist ring means; drive means for attaching a means for applying a torque; socket retainer means for releasably connecting said housing means and said drive means; support means for supporting an object; and a body portion connecting said drive means and said support means, said body portion adapted to engage a portion of the object, the improvement comprising: counterbalance means for resiliently connecting said socket retainer means and said housing means, whereby said counterbalance means reduces the force due to the weight of the object when the object is lifted to the position from which it will be torqued, and the torque applied to said drive means is transferred through the body portion to said object.

* * * * *